United States Patent [19]
DeFelice et al.

[11] Patent Number: 5,983,767
[45] Date of Patent: Nov. 16, 1999

[54] ANGULARLY ADJUSTABLE SAW GUIDING DEVICE HAVING A SAW SUPPORTING SURFACE

[75] Inventors: William D. DeFelice, Glastonbury, Conn.; Robert L. Owens, Shaftsbury, Vt.

[73] Assignee: The Stanley Works, Inc., New Britain, Conn.

[21] Appl. No.: 09/048,979

[22] Filed: Mar. 27, 1998

Related U.S. Application Data

[63] Continuation-in-part of application No. 29/059,501, Sep. 12, 1996.

[51] Int. Cl.⁶ .................................................... B27B 9/04
[52] U.S. Cl. ............................ 83/745; 83/581; 83/522.25
[58] Field of Search .............................. 83/745, 743, 744, 83/581, 522.25, 574

[56] References Cited

U.S. PATENT DOCUMENTS

| | | | |
|---|---|---|---|
| 4,509,398 | 4/1985 | Mason | 83/745 |
| 4,539,881 | 9/1985 | Maier | 83/745 |
| 4,608,898 | 9/1986 | Volk | 83/745 |
| 4,840,097 | 6/1989 | Campbell | 83/745 |
| 4,907,482 | 3/1990 | Hujo | 83/745 |
| 5,084,977 | 2/1992 | Perkins | 83/745 |
| 5,148,730 | 9/1992 | McCaw | 83/745 |
| 5,182,975 | 2/1993 | Warner | 83/745 |
| 5,226,345 | 7/1993 | Gamble | 83/745 |
| 5,385,183 | 1/1995 | Ferranti | 83/745 |
| 5,390,425 | 2/1995 | Gilberts | 83/745 |
| 5,487,319 | 1/1996 | Cody | 83/745 |
| 5,704,263 | 1/1998 | Swanberg | 83/745 |

Primary Examiner—Rinaldi I. Rada
Assistant Examiner—Gyounghyun Bae
Attorney, Agent, or Firm—Pillsbury Madison & Sutro LLP

[57] ABSTRACT

The present invention is a saw guiding device for guiding a power saw when cutting a workpiece in the form of either a flat board or an I-beam. The saw guiding device comprises a base member which is to be disposed across end caps of an I-beam. A straight saw guiding surface of the base member is configured such that a power saw can be engaged therewith and slidably moved therealong to thereby guide the power saw in a straight line as it cuts the I-beam. The base member includes an upwardly facing saw supporting surface disposed adjacent the straight saw guiding surface. The upwardly facing saw supporting surface is constructed and arranged to support the power saw as it is engaged with and slidably moved along the straight saw guiding surface between the end caps of the I-beam. The base member has a workpiece edge engaging structure extending downwardly therefrom. A movable workpiece edge engaging structure is constructed and arranged to be moved through a range of operative positions. The movable workpiece engaging structure is fixable at various locations within the operative range. Both the workpiece edge engaging structure and the movable workpiece edge engaging structure are simultaneously engageable with one edge of an I-beam end cap when the base member is disposed across the end caps and the workpiece engaging structure is fixed at one of the various locations of the range of operative positions to set a desired cutting angle at which the straight saw guiding surface is disposed.

15 Claims, 5 Drawing Sheets

ANGULARLY ADJUSTABLE SAW GUIDING DEVICE HAVING A SAW SUPPORTING SURFACE

This is a Continuation-in-Part of National Appln. No. 29/059,501 filed Sep. 12, 1996.

The present invention relates to saw guiding devices for guiding a power saw when cutting a workpiece and, more particularly, to a saw guiding device for supporting a power saw between the end caps of an I-beam and guiding the saw along a desired cutting angle.

When cutting a workpiece, such as a flat wooden board or an I-beam, with a power saw it is often desirable to use a saw guide to ensure a straight and accurate cut. Without such a guide, a user typically must mark a straight line in pencil and attempt to manually guide the saw along the marked line.

It is also desirable to be able to provide a saw guide which can be angularly adjusted to guide the power saw at a desired angle with respect to the edge of the workpiece. An example of such a saw guide is disclosed in U.S. Pat. No. 5,182,975. This type of conventional saw guide, however, is ill-suited to be utilized when cutting across the end caps of an I-beam because after cutting one of the end caps, the saw must be lifted up, moved to the other end cap, and then realigned with the saw guide in order to cut the other end cap.

Thus, there exists a need for a saw guiding device which can be adjusted to guide a power saw at an angle with respect to the edge of a workpiece and is suitable to be easily used with both regular, flat boards and I-beams.

It is therefore an object of the present invention to meet the needs expressed above. The present invention is a saw guiding device for guiding a power saw when cutting a workpiece in the form of either a flat board or an I-beam. The saw guiding device comprises a base member having a downwardly facing workpiece engaging surface and a straight saw guiding surface. The base member is constructed and arranged to be disposed across end caps of an I-beam with the downwardly facing workpiece engaging surface thereof engaging upwardly facing surfaces of the end caps.

The straight saw guiding surface of the base member is positioned and configured such that a power saw can be engaged therewith and slidably moved therealong to thereby guide the power saw in a straight line parallel to the straight saw guiding surface as it cuts the I-beam. The base member includes an upwardly facing saw supporting surface disposed adjacent the straight saw guiding surface. The upwardly facing saw supporting surface is constructed and arranged to support the power saw as it is engaged with and slidably moved along the straight saw guiding surface between the end caps of the I-beam.

The base member has a workpiece edge engaging structure extending downwardly therefrom. The workpiece edge engaging structure is positioned and configured to be engaged with one edge of one of the I-beam end caps when the base member is disposed across the end caps of the I-beam with the downwardly facing workpiece engaging surface thereof engaging the upwardly facing surfaces of the end caps.

A movable workpiece edge engaging structure is constructed and arranged to be moved through a range of operative positions. The movable workpiece engaging structure is fixable at various locations within the operative range. Both the workpiece edge engaging structure and the movable workpiece edge engaging structure are simultaneously engageable with the one edge of the I-beam end cap when the base member is disposed across the end caps and the workpiece engaging structure is fixed at one of the various locations of the range of operative positions to set a desired cutting angle at which the straight saw guiding surface is disposed with respect to the one edge of the I-beam end cap to thereby guide the power saw in a straight line parallel to the straight saw guiding surface at the desired cutting angle as it cuts the I-beam. The movable workpiece edge engaging structure is movable into another one of the various locations within the range of operative positions and fixable thereat. The another one of the various locations corresponds to another desired cutting angle at which the saw guiding surface is disposed with respect to the one edge of the I-beam end cap. Both the workpiece edge engaging structure and the movable workpiece edge engaging structure are engageable with the one edge of the I-beam end cap when the base member is disposed across the I-beam end caps and the movable workpiece edge engaging structure is fixed at the another one of the various locations to set another desired cutting angle at which the straight saw guiding surface is disposed with respect to the one edge of the I-beam end cap to thereby guide the power saw in a straight line parallel to the straight saw guiding surface at the another desired cutting angle as it cuts the I-beam.

Other objects and advantages of the present invention will become apparent from the claims appended hereto and the following detailed description.

DETAILED DESCRIPTION OF THE DRAWINGS

Figure 1:
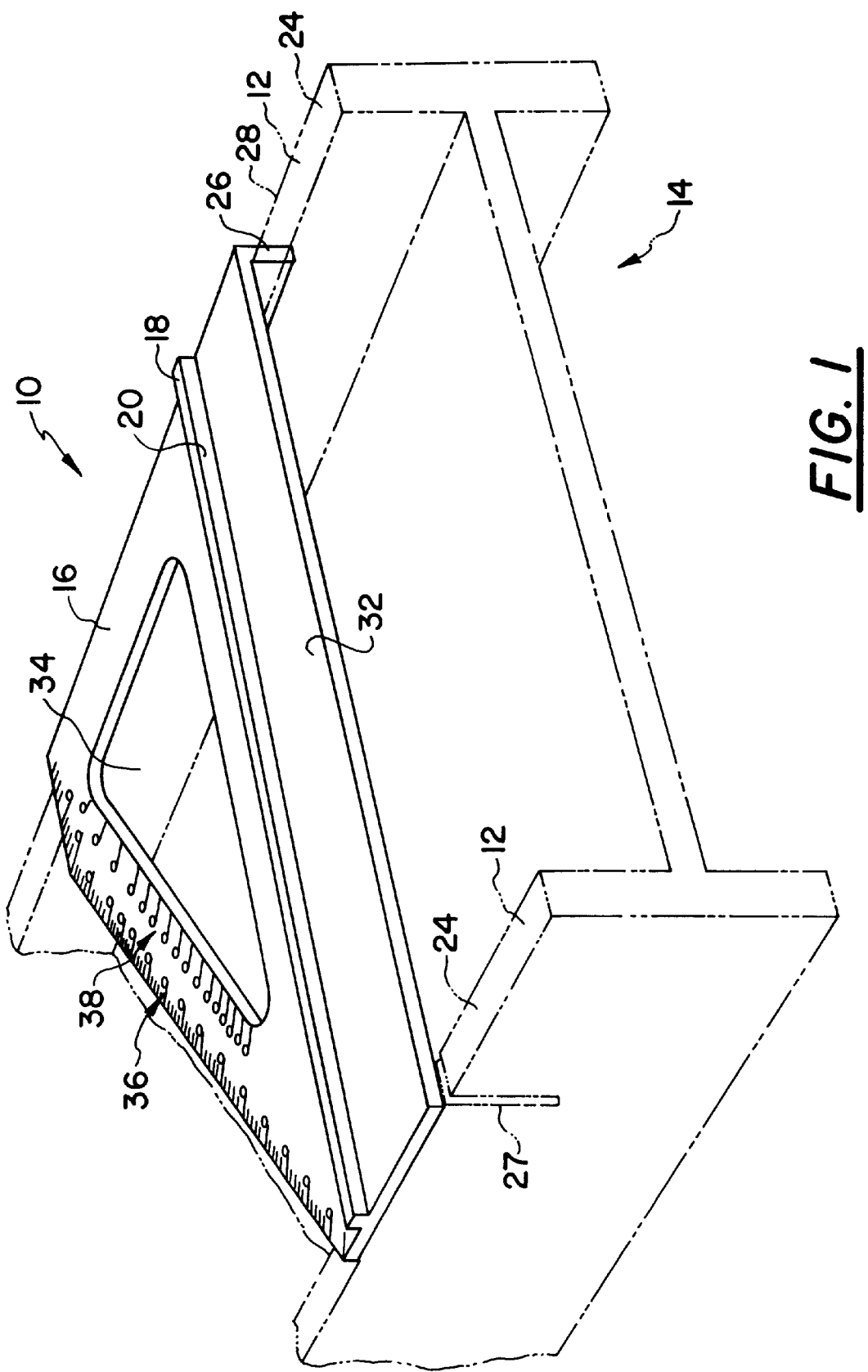
FIG. 1 is a perspective view of a saw guiding device embodying the principles of the present invention mounted across the end caps of an I-beam.
Figure 5:
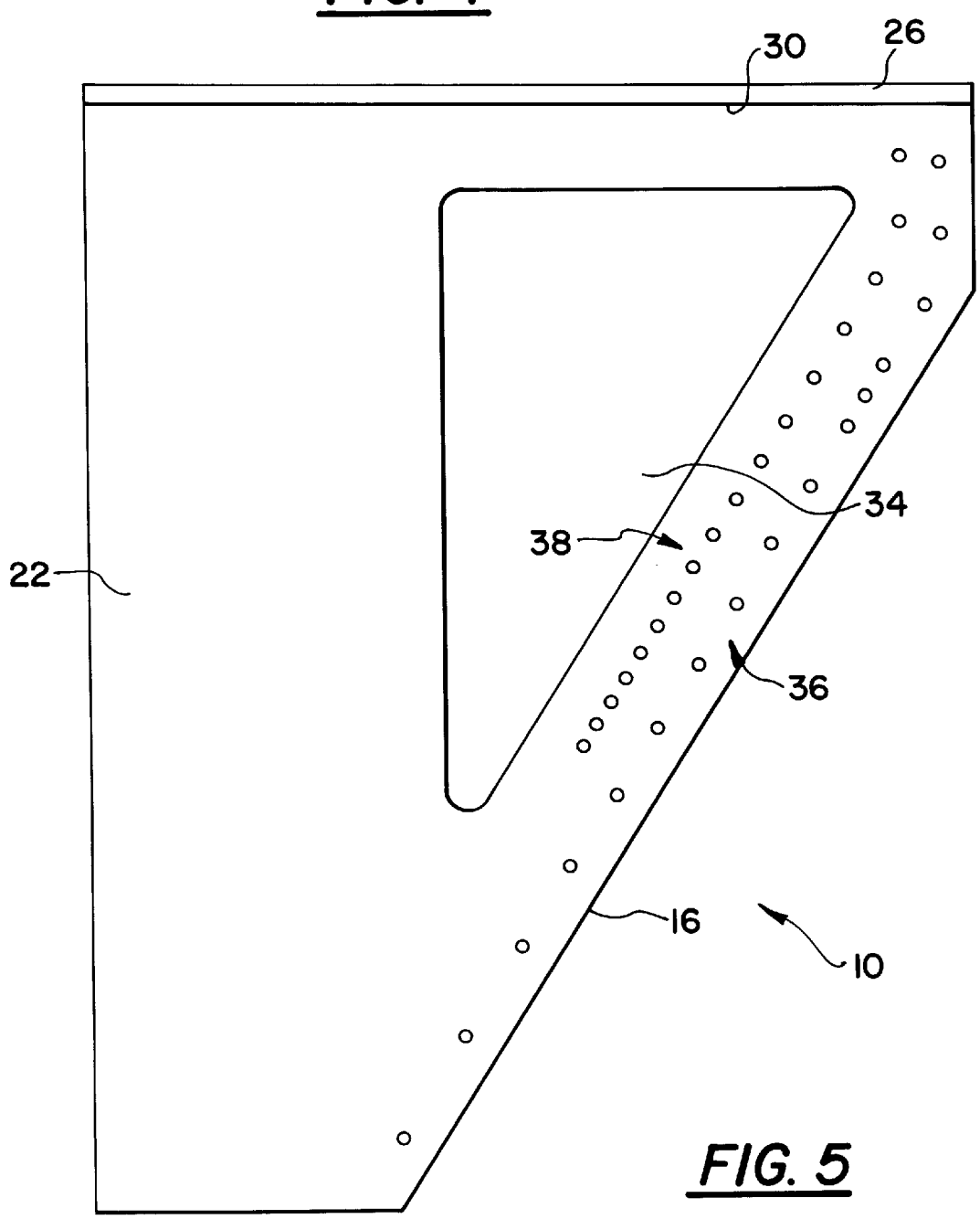
FIG. 5 is a bottom view of the saw guiding device of the present invention.
Figure 6:
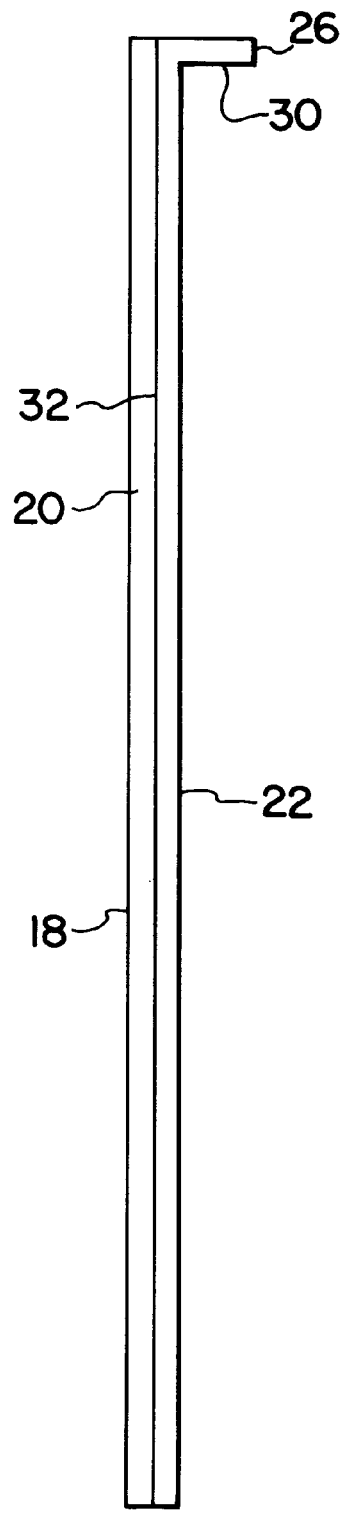
FIG. 6 is a side view of the saw guiding device of the present invention.
Figure 7:
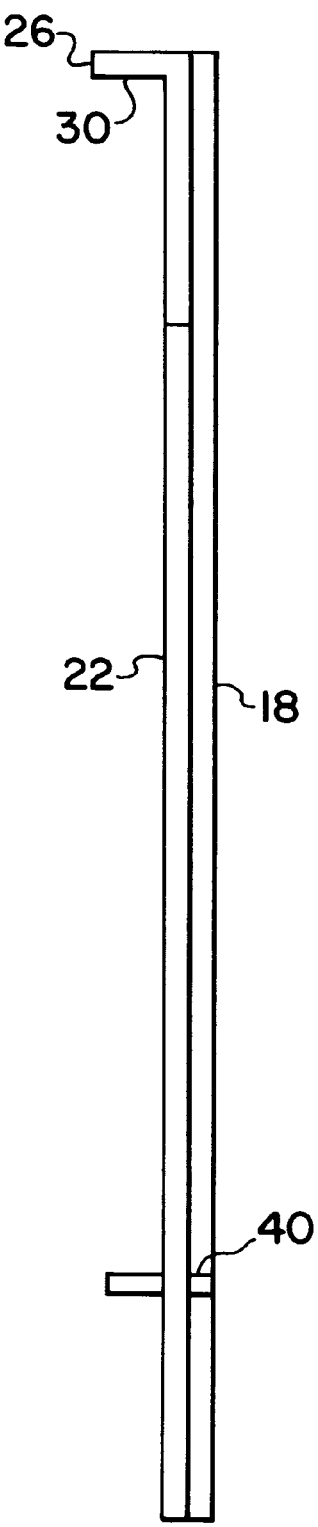
FIG. 7 is a side view similar FIG. 6 from the opposite side of the saw guiding device of the present invention.

Referring more particularly to the drawings, FIG. 1 illustrates a saw guiding device of the present invention, generally indicated at 10, mounted transversely across the end caps 12 of a workpiece in the form of an I-beam 14. The device 10 includes an injection molded base member 16. The base member 16 has a saw guiding structure in the form of a ridge 18 projecting upwardly therefrom to provide a straight saw guiding surface 20. The base member 16 is generally planar and defines a downwardly facing workpiece engaging surface 22 (FIG. 5). It is preferable to injection mold the base member 16 from plastic in order to provide the saw guiding device 10 with a simple, inexpensive construction.

The downwardly facing workpiece engaging surface 22 of the base member 16 engages upwardly facing surfaces 24 of the end caps 12 of the I-beam 14 illustrated in FIG. 1 when the base member 16 is placed thereon. It should be understood that the device of the present invention may be used with other workpieces, such as a flat board. The most advantageous features of the device 10, however, are realized when using the device while cutting across an I-beam.

Figure 3:
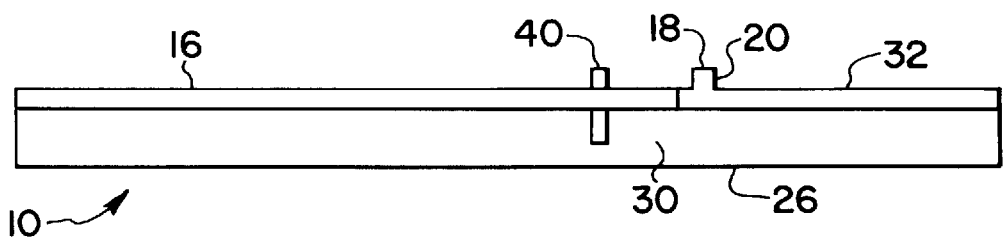
FIG. 3 is a end view of the saw guiding device of the present invention with a movable workpiece engaging structure in the form of a cylindrical peg in an operating position.
Figure 4:
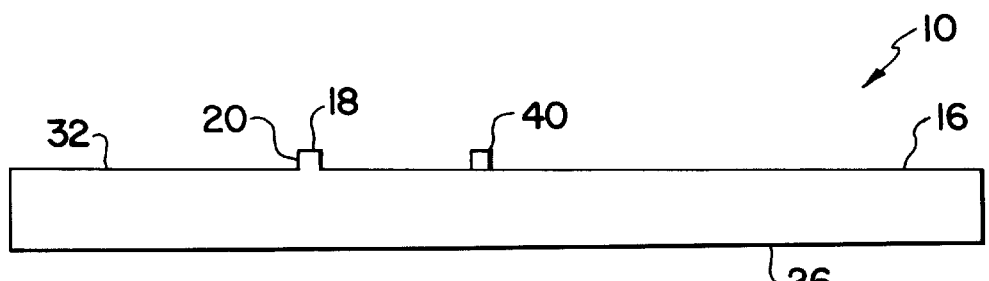
FIG. 4 is end view similar to FIG. 3 from the opposite side of the saw guiding device of the present invention.

Extending downwardly from the base member 16 is a workpiece engaging structure in the form of a longitudinally extending lip 26, best seen in FIG. 3. The longitudinally lip 26 is constructed and arranged to engage an edge 28 of the I-beam 14 when the base member 16 is disposed thereon with the downwardly facing engaging surface 22 engaging the upwardly facing engaging surfaces 24 of the end caps 12 of the I-beam 14. Preferably, the longitudinally extending lip 26 extends longitudinally perpendicular to the straight saw guiding surface 20 so that the entire inner surface 30 of the lip can be engaged with the edge 28 of the I-beam so that a saw (schematically represented as S in FIG. 8) can be engaged with and moved along the saw guiding surface 20 so as to cut through the workpiece at a right angle with respect to the edge 28. A cut 27 made at a right angle with respect to the edge 28 of the I-beam 14 is illustrated in FIG. 1.

Figure 8:
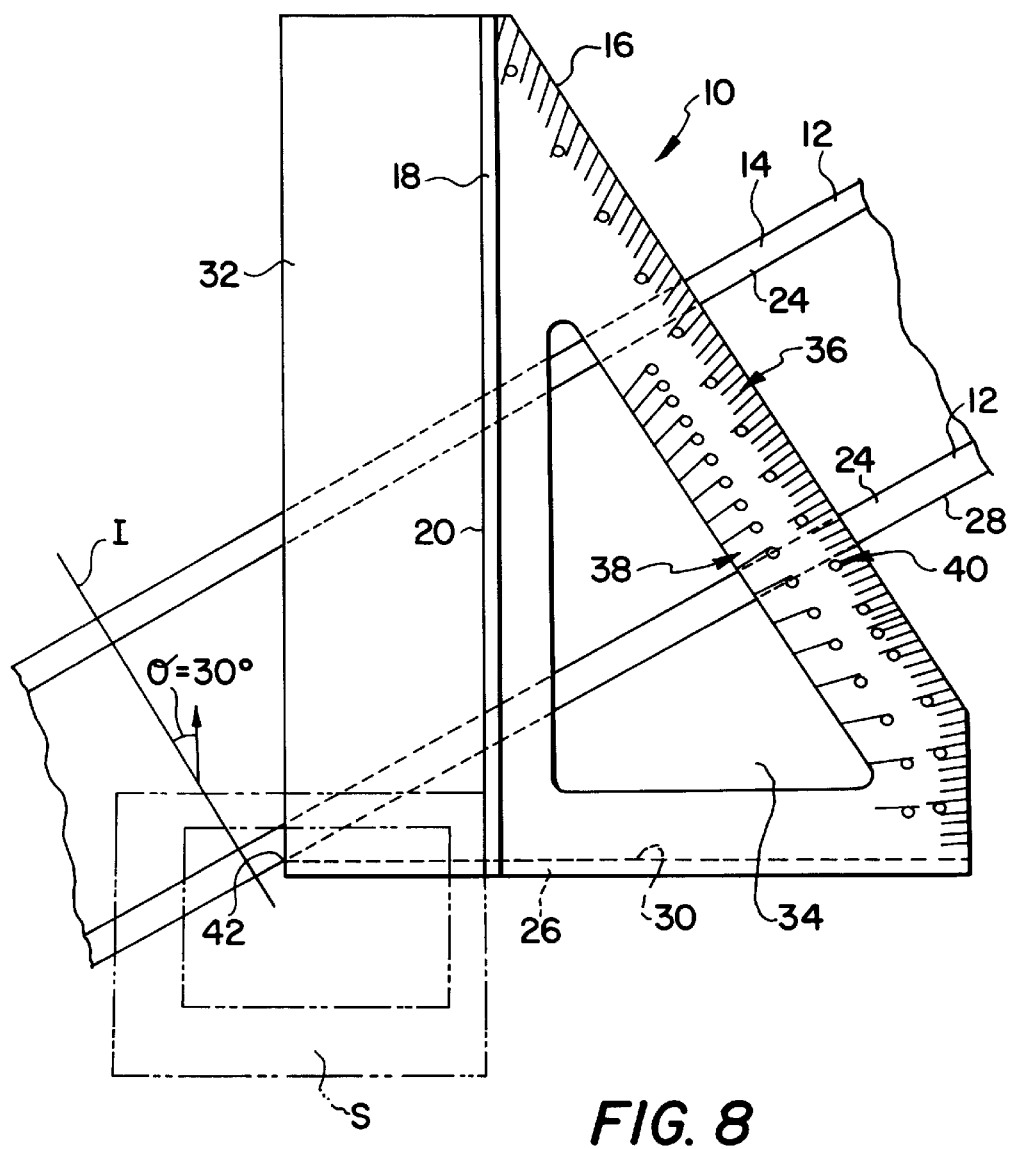
FIG. 8 is a top view of the saw guiding device of the present invention disposed on an I-beam with the movable workpiece engaging structure in the operating position thereof.
Figure 9:
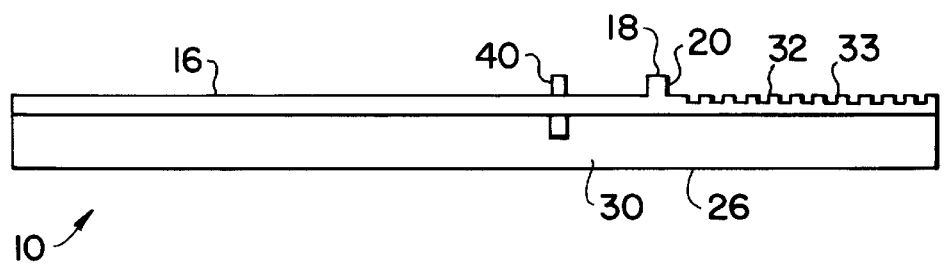
FIG. 9 is view similar to FIG. 3 showing grooves formed on an upwardly facing saw supporting surface of the device.

On one side of the ridge 18, there is an upwardly facing saw supporting surface 32. The saw supporting surface 32 is constructed such that a saw, such a circular saw or a skill saw, can be disposed thereon with a portion engaging the saw guiding surface 20 of the ridge 18. When the saw S is engaged with and moved along the saw guiding surface 20, a downwardly facing surface of the saw rides along the saw supporting surface 32. It is preferable that the saw supporting surface 32 be designed so as to reduce the friction between it and the saw S (FIG. 8). Contemplated designs may include coating the surface 32 with low friction material such as Teflon® or providing grooves 33 (FIG. 9) thereon to minimize the contact between the saw supporting surface 32 and the saw S. Providing the saw supporting surface 32 is especially desirable when the device 10 is mounted across the end caps 12 of an I-beam 14 as shown in FIG. 1 because it supports the saw S as it is being moved from one end cap to the other end cap.

On the other side of the ridge 18, the base member 16 has a generally triangular shape with a relatively large triangular opening 34 in a centrally located region thereof. Two sets of apertures 36,38 are formed through the base member 16. These apertures 36,38 are configured to removably receive a movable workpiece engaging structure in the form of a cylindrical pin 40. The apertures 36,38 define a range of operating positions through which the cylindrical pin 40 may be moved. This range of operating positions, i.e. the apertures 36,38, through which the cylindrical pin 40 can be moved, corresponds to a range of predetermined cutting angles along which the saw guiding surface 20 can be aligned with respect to the edge 28 of the I-beam 14. As best shown in FIG. 8, the straight saw guiding surface 20 can be aligned with the edge 28 of the I-beam 14 at a desired one of the predetermined cutting angles by moving the cylindrical pin 40 into one of the range of operating positions, i.e. one of the apertures, corresponding to the desired one of the predetermined cutting angles and then engaging both the end of the longitudinally extending lip 26 and the portion of the cylindrical pin 40 extending downwardly from the base member 16 with the edge 28 of the I-beam 14. The saw S can then be engaged with and moved along the saw guiding surface 20 at the desired angle.

It is to be understood that it is not necessary to use a plurality of apertures to define the range of operating positions. It is contemplated that the movable workpiece engaging structure may take the form of a pin which can be slidably moved through a continuous range of operating positions. An example of such a construction is disclosed in the aforementioned U.S. Pat. No. 5,182,975 which is hereby incorporated into the present application by reference.

Figure 2:
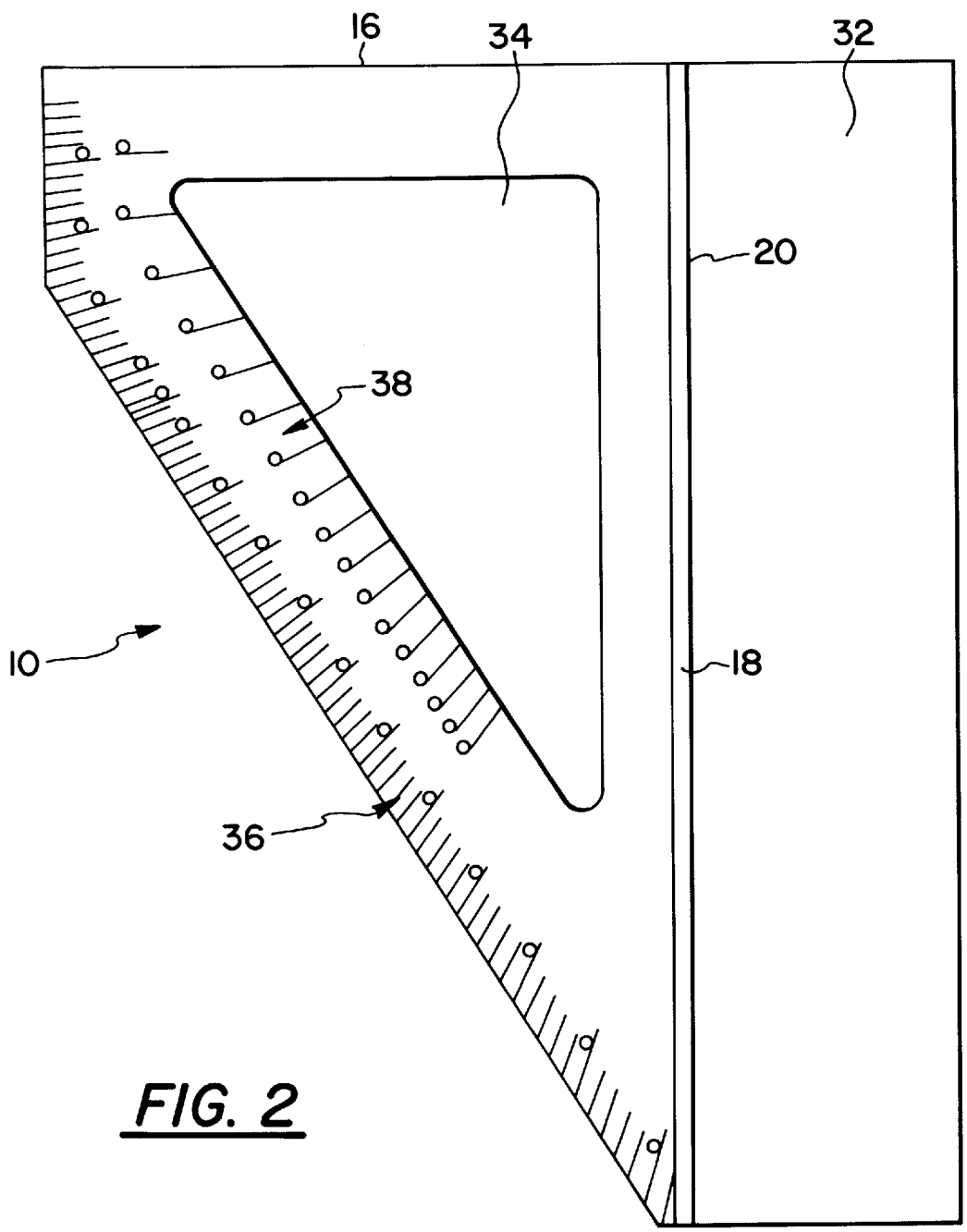
FIG. 2 is a top view of a saw guiding device embodying the principles of the present invention.

As can be best seen in FIGS. 2 and 8, each set of apertures 36,38 is provided with a set of numbers adjacent each aperture. The numbers adjacent the outer degree set of apertures 36 are marked 5–75 in increments of 5. These numbers show the angle at which the straight saw guiding edge 20 is aligned with respect to an imaginary line extending perpendicularly to the edge 28 of the I-beam 14 in degrees. As one can see in FIG. 8, the pin 40 is inserted in an aperture marked 30° and the angle ≃ at which the saw guiding surface 20 is aligned with respect to imaginary line I is also 30°.

The set of numbers adjacent the inner rise set of apertures 38 are marked 1–17 in increments of 1. These rise numbers indicate the angle at which the saw guide surface 20 is disposed in terms of inches of rise. In more specific geometric terms, each of the rise numbers indicates the angle at which the straight saw guiding surface 20 is disposed with respect to the imaginary line I extending perpendicular to the edge 28 of the I-beam 14 as a number which equals twelve multiplied by the tangent of the angle at which the saw guiding surface is disposed with respect to imaginary line I when the removable pin 40 is removably inserted into an associated one of the rise apertures 38 and both the removable pin 40 and the downwardly extending lip member 26 are engaged with the one edge 28 of the I-beam 14. As can be seen from both sets of numbers, a twelve inch rise over one foot corresponds to forty five degrees, as would be expected. This set of rise numbers is especially useful when constructing roofs because the slope of a roof is often expressed in terms of rise rather than degrees. Thus, when cutting a support member to be used to support a roof having a slope of 6, one can easily insert the cylindrical pin 40 into the aperture numbered 6 and cut through the member at a proper angle without having to mathematically determine which angle in terms of degrees he should be selecting.

With respect to both sets of numbers adjacent the apertures 36,38, the focal point of the angles which are shown, whether it be in terms of degrees or rise, is located at the intersection of the inner surface 30 of the lip member 26 and the outer edge of the base member, indicated at 42 in FIG. 8. Thus, the angle of the saw guiding surface 20 can be adjusted by removing the cylindrical pin 40 and pivoting the base member 16 about point 42.

Any United States patent applications or patents mentioned or cited hereinabove are hereby incorporated by reference into the present application.

It will thus be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed:

1. A saw guiding device for guiding a power saw when cutting a workpiece in the form of either a flat board or an I-beam, said saw guiding device comprising:

a base member having a downwardly facing workpiece engaging surface and a straight saw guiding surface;

said base member being constructed and arranged to be disposed across end caps of an I-beam with said downwardly facing workpiece engaging surface thereof engaging upwardly facing surfaces of the end caps, said straight saw guiding surface of said base member being positioned and configured such that a power saw can be engaged therewith and slidably moved therealong to thereby guide the power saw in a straight line parallel to said straight saw guiding surface as the saw cuts the I-beam, said base member including an upwardly facing saw supporting surface disposed adjacent said straight saw guiding surface, said upwardly facing saw supporting surface being constructed and arranged to support the power saw as the saw is engaged with and slidably moved along said straight saw guiding surface between the end caps of the I-beam, said base member having a workpiece edge engaging structure extending downwardly therefrom, said workpiece edge engaging structure being positioned and configured to be engaged with one edge of one of the I-beam end caps when said base member is disposed across the end caps of the I-beam with said downwardly facing workpiece engaging surface thereof engaging the upwardly facing surfaces of the end caps; and a removable workpiece edge engaging structure;

said base member having a plurality of spaced apart receiving portions, said removable workpiece engaging structure and said receiving portions each having shapes which are configured such that said removable workpiece edge engaging structure can be removably received within a selected one of said receiving portions, thereby enabling both said workpiece edge engaging structure and said removable workpiece edge engaging structure to be engaged with the one edge of the I-beam end cap when said base member is disposed across the end caps structure is fixed at one end of said various locations of said range of operative to set a desired cutting angle at which said straight saw guiding surface is disposed with respect to the one edge of the I-beam end cap to thereby guide the power saw in a straight line parallel to said straight saw guiding surface at said desired cutting angle as it cuts the I-beam, the shapes of said removable workpiece engaging structure and said receiving portions being configured such that said removable workpiece edge engaging structure can be removed from said selected one of said receiving portions and then be removably received within another selected one of said receiving portions, thereby enabling both said workpiece edge engaging structure and said removable workpiece edge engaging structure to be engaged with the one edge of the I-beam end cap when said base member is disposed across the I-beam end caps to set another desired cutting angle at which said straight saw guiding surface is disposed with respect to the one edge of the I-beam end cap to thereby guide the power saw in a straight line parallel to said straight saw guiding surface at said another desired cutting angle as it cuts the I-beam.

2. A saw guiding device according to claim 1 wherein said plurality of receiving portions is defined by a plurality of spaced apart apertures formed through said base member, said removable workpiece engaging structure being a removable pin constructed and arranged to be removably inserted into said apertures.

3. A saw guiding device according to claim 2 wherein said workpiece edge engaging structure is a downwardly extending lip member integrally molded with extending along a side of said base member which is perpendicular to said straight saw guiding surface.

4. A saw guiding device according to claim 3 wherein said saw guiding surface is formed on a saw guiding structure integrally molded with extending upwardly from said base member adjacent said saw supporting surface.

5. A saw guiding device according to claim 3 wherein said plurality of apertures comprises a set of degree apertures, said set of degree apertures having degree numbers adjacent each aperture thereof, each of said degree numbers indicating an angle in degrees at which said straight saw guiding surface is disposed with respect to an imaginary line extending perpendicularly to the one edge of the I-beam end cap when said removable pin is removably inserted into an associated one of said degree apertures and both said removable pin and said downwardly extending lip member are engaged with the one edge of the I-beam end cap.

6. A saw guiding device according to claim 5 wherein said plurality of apertures further comprises a set of rise apertures:

said set of rise apertures having rise numbers adjacent each aperture thereof, each of said rise numbers indicating the angle in terms of rise at which said straight saw guiding surface is disposed with respect to the imaginary line extending perpendicular to the one edge of the I-beam end cap when said removable pin is removably inserted into an associated one of said rise apertures and both said removable pin and said downwardly extending lip member are engaged with the one edge of the I-beam end cap, each of said rise numbers equaling twelve multiplied by the tangent of the angle at which said straight saw guiding surface is disposed with respect to the aforesaid imaginary line.

7. A saw guiding device according to claim 4 wherein said upwardly facing saw supporting surface is coated with a low friction material to thereby reduce friction as the power saw is moved therealong.

8. A saw guiding device according to claim 5 wherein said upwardly facing saw supporting surface has one or more grooves to thereby reduce friction as the power saw is moved therealong.

9. A saw guiding device for guiding a power saw when cutting a workpiece in the form of either a flat board or an I-beam, said saw guiding device comprising:

a one-piece injection molded base member having a downwardly facing workpiece engaging surface and a straight saw guiding surface, said base member being constructed and arranged such that said workpiece engaging surface can be engaged with upwardly facing surfaces of a pair of I-beam end caps and the power saw can then be engaged with said saw guiding surface and slidably moved in a straight line parallel to said saw guiding surface as the saw cuts the I-beam;

said base member including an upwardly facing saw supporting surface disposed adjacent said straight saw guiding surface, said saw supporting surface being constructed and arranged to support the power saw as the saw is engaged with and slidably moved along said saw guiding surface between the I-beam end caps;

said base member having fixed workpiece edge engaging structure integrally molded therewith and extending downwardly therefrom; and a moveable workpiece engaging structure constructed and arranged to be moved relative to said base member through a range of operating positions and then be fixed at a selected one of said range of operating positions wherein said movable workpiece engaging structure depends downwardly from said base member, thereby enabling both said fixed and movable workpiece edge engaging structures to be engaged with one edge of an I-beam end cap with said downwardly facing workpiece engaging surface of said base member engaging the upwardly facing surfaces of the I-beam end caps to set the straight saw guiding surface at a desired angle with respect to the one edge of the I-beam end cap;

said movable workpiece engaging structure being constructed and arranged to be moved relative to said base member through said range of operating positions and then be fixed at another selected one of said range of operating positions wherein said movable workpiece engaging structure depends downwardly from said base member, thereby enabling both said fixed and movable workpiece edge engaging structure to be engaged with the one edge of the I-beam end cap with said downwardly facing workpiece engaging surface of said base member engaging the upwardly facing surfaces of the I-beam end caps to set the straight saw guiding surface of another desired angle with respect to the one edge of the I-beam end cap.

10. A saw guiding device according to claim 9, wherein said moveable workpiece edge engaging structure is a removable workpiece edge engaging structure which can be removed from said base member and wherein said range of operating positions is defined by a plurality of spaced apart receiving portions to which said removable workpiece edge engaging structure can be selectively removably mounted.

11. A saw guiding device according to claim 10, wherein said plurality of receiving portions is defined by a plurality of spaced apart apertures;

said removable workpiece engaging structure being a removable pin constructed and arranged to be removably inserted into said apertures.

12. A saw guiding device for guiding a power saw when cutting a workpiece in the form of either a flat board or an I-beam, said saw guiding device comprising:

a base member having a downwardly facing workpiece engaging surface and a straight saw guiding surface;

said base member being constructed and arranged to be disposed across end caps of an I-beam with said downwardly facing workpiece engaging surface thereof engaging upwardly facing surfaces of the end caps, said straight saw guiding surface of said base member being positioned and configured such that a power saw can be engaged therewith and slidably moved therealong to thereby guide the power saw in a straight line parallel to said straight saw guiding surface as it cuts the I-beam, said base member including an upwardly facing saw supporting surface disposed adjacent said straight saw guiding surface, said upwardly facing saw supporting surface being constructed and arranged to support the power saw as it is engaged with and slidably moved along said straight saw guiding surface between the end caps of the I-beam, said base member having a fixed workpiece edge engaging structure extending downwardly therefrom, said fixed workpiece edge engaging structure being positioned and configured to be engaged with one edge of one of the I-beam end caps when said base member is disposed across the end caps of the I-beam with said downwardly facing workpiece engaging surface thereof engaging the upwardly facing surfaces of the end caps; and a moveable workpiece engaging structure constructed and arranged to be moved relative to said base member and said fixed workpiece edge engaging structure through a range of operating positions and then be fixed at a selected one of said range of operating positions wherein said movable workpiece engaging structure depends downwardly from said base member, thereby enabling both said fixed and movable workpiece edge engaging structures to be engaged with one edge of an I-beam end cap with said downwardly facing workpiece engaging surface of said base member engaging the upwardly facing surfaces of the I-beam end caps to set the straight saw guiding surface at a desired angle with respect to the one edge of the I-beam end cap;

said movable workpiece engaging structure being constructed and arranged to be moved relative to said base member and said fixed workpiece edge engaging structure through said range of operating positions and then be fixed at another selected one of said range of operating positions wherein said movable workpiece engaging structure depends downwardly from said base member, thereby enabling both said fixed and movable workpiece edge engaging structure to be engaged with the one edge of the I-beam end cap with said downwardly facing workpiece engaging surface of said base member engaging the upwardly facing surfaces of the I-beam end caps to set the straight saw guiding surface of another desired angle with respect to the one edge of the I-beam end cap.

13. A saw guiding device according to claim 12, wherein said base member is injection molded with said fixed workpiece engaging structure integrally molded therewith.

14. A saw guiding device according to claim 12, wherein said moveable workpiece edge engaging structure is a removable workpiece edge engaging structure which can be removed from said base member and wherein said range of operating positions is defined by a plurality of spaced apart receiving portions to which said removable workpiece edge engaging structure can be selectively removably mounted.

15. A saw guiding device according to claim 14, wherein said plurality of receiving portions is defined by a plurality of spaced apart apertures;

said removable workpiece engaging structure being a removable pin constructed and arranged to be removably inserted into said apertures.

\* \* \* \* \*